(12) United States Patent
Karlsson et al.

(10) Patent No.: US 8,990,843 B2
(45) Date of Patent: Mar. 24, 2015

(54) EYE TRACKING BASED DEFOCUSING

(71) Applicant: MobiTV Inc., Emeryville, CA (US)

(72) Inventors: Kent Karlsson, Berkeley, CA (US); Avery Audrey Kwan, Oakland, CA (US)

(73) Assignee: MobiTV, Inc., Emeryville, CA (US)

( * ) Notice: Subject to any disclaimer, the term of this patent is extended or adjusted under 35 U.S.C. 154(b) by 33 days.

(21) Appl. No.: 13/661,308

(22) Filed: Oct. 26, 2012

(65) Prior Publication Data

US 2014/0123162 A1    May 1, 2014

(51) Int. Cl.
| | |
|---|---|
| *H04H 60/56* | (2008.01) |
| *H04N 21/433* | (2011.01) |
| *H04N 21/442* | (2011.01) |
| *H04N 21/643* | (2011.01) |
| *H04N 21/845* | (2011.01) |

(52) U.S. Cl.
CPC ....... *H04N 21/8456* (2013.01); *H04N 21/4331* (2013.01); *H04N 21/44218* (2013.01); *H04N 21/64322* (2013.01)
USPC .......................................................... 725/12

(58) Field of Classification Search
None
See application file for complete search history.

(56) References Cited

U.S. PATENT DOCUMENTS

| | | | | |
|---|---|---|---|---|
| 6,078,349 | A * | 6/2000 | Molloy ....................... | 348/14.07 |
| 6,959,450 | B1 * | 10/2005 | Ritter et al. .................... | 725/133 |
| 7,809,160 | B2 * | 10/2010 | Vertegaal et al. ............. | 382/103 |
| 8,594,374 | B1 | 11/2013 | Bozarth | |
| 2002/0103625 | A1 * | 8/2002 | Card et al. ..................... | 702/187 |
| 2002/0141614 | A1 * | 10/2002 | Lin ................................ | 382/103 |
| 2003/0194142 | A1 * | 10/2003 | Kortum et al. ................ | 382/239 |
| 2004/0156020 | A1 * | 8/2004 | Edwards ........................ | 351/209 |
| 2004/0181168 | A1 | 9/2004 | Plant et al. | |
| 2005/0175218 | A1 * | 8/2005 | Vertegaal et al. ............. | 382/103 |
| 2006/0119571 | A1 * | 6/2006 | Scheuering ................... | 345/156 |
| 2006/0136451 | A1 * | 6/2006 | Denissov ....................... | 707/101 |
| 2006/0136965 | A1 | 6/2006 | Ellis et al. | |
| 2007/0164990 | A1 | 7/2007 | Bjorklund et al. | |
| 2007/0165964 | A1 * | 7/2007 | Wolf et al. .................... | 382/276 |

(Continued)

FOREIGN PATENT DOCUMENTS

WO      2008104988 A2      9/2008

OTHER PUBLICATIONS

U.S. Appl. No. 13/523,353, Kwan, filed Jun. 14, 2012.

(Continued)

*Primary Examiner* — Nathan Flynn
*Assistant Examiner* — William J Kim
(74) *Attorney, Agent, or Firm* — Kwan & Olynick LLP

(57) ABSTRACT

Described herein are techniques and mechanisms for eye tracking based defocusing. According to various embodiments, video content may be transmitted from a server for presentation at a remote computing device in communication with the server via a network. Eye tracking information identified via an optical sensor at the client machine may be received from the remote computing device. The eye tracking information may describe a state of one or both eyes of an individual located proximate to the remote computing device. A first portion of the video content on which the eyes are more focused relative to a second portion of the video content may be identified. The video content may be updated based on the received eye tracking information. The second portion of the video content may be defocused relative to the first portion of the video content in the updated video content.

20 Claims, 10 Drawing Sheets

(56) References Cited

U.S. PATENT DOCUMENTS

| | | | | |
|---|---|---|---|---|
| 2008/0111833 | A1* | 5/2008 | Thorn et al. | 345/690 |
| 2009/0141895 | A1 | 6/2009 | Anderson et al. | |
| 2010/0039618 | A1* | 2/2010 | De Lemos | 351/209 |
| 2011/0106847 | A1* | 5/2011 | Bocharov et al. | 707/770 |
| 2011/0126248 | A1* | 5/2011 | Fisher et al. | 725/95 |
| 2012/0219265 | A1* | 8/2012 | Sriganesh et al. | 386/230 |
| 2013/0219012 | A1* | 8/2013 | Suresh et al. | 709/217 |
| 2013/0340005 | A1 | 12/2013 | Kwan, Avery A. | |
| 2013/0340006 | A1 | 12/2013 | Kwan, Avery A. | |
| 2013/0342672 | A1 | 12/2013 | Gray et al. | |
| 2014/0055337 | A1 | 2/2014 | Karlsson | |

OTHER PUBLICATIONS

U.S. Appl. No. 13/523,368, Kwan, filed Jun. 14, 2012.

U.S. Appl. No. 13/591,481, Karlsson, filed Aug. 22, 2012.

"Tobii Eye Tracking: An Introduction to Eye Tracking and Tobii Eye Trackers", *White Paper, Tobii Technology*, [Online]. Retrieved from the Internet: <http://www.tobii.com/Global/Analysis/Training/WhitePapers/Tobii_Eye Tracking_Introduction_WhitePaper.pdf?epslanguage=> Accessed on Jul. 17, 2012,(Jan. 27, 2010), 14 pgs.

U.S. Appl. No. 13/523,353, Final Office Action mailed Nov. 5, 2013, 15 pgs.

U.S. Appl. No. 13/523,353, Non Final Office Action mailed Jun. 7, 2013, 14 pgs.

U.S. Appl. No. 13/523,368, Final Office Action mailed Nov. 5, 2013, 14 pgs.

U.S. Appl. No. 13/523,368, Non Final Office Action mailed Jun. 12, 2013, 13 pgs.

"Tobii Eye Tracking: An Introduction to Eye Tracking and Tobii Eye Trackers", White Paper, Tobii Technology, [Online]. Retrieved from the Internet: <http://www.tobii.com/Global/Analysis/Training/WhitePapers/Tobii_EyeTra cking_Introduction_WhitePaper.pdf?epslanguage=en > Accessed on Jul. 17, 2012, Jan. 27, 2010 00:00:00.0,.

U.S. Appl. No. 13/523,353, Advisory Action mailed Jan. 16, 2014,.

U.S. Appl. No. 13/523,353, Examiner Interview Summary mailed Jan. 22, 2014,.

U.S. Appl. No. 13/523,353, Non Final Office Action mailed Sep. 26, 2014,.

U.S. Appl. No. 13/591,481, Final Office Action mailed Sep. 3, 2014,.

U.S. Appl. No. 13/591,481, Non Final Office Action mailed Feb. 13, 2014,.

* cited by examiner

EYE TRACKING BASED DEFOCUSING

TECHNICAL FIELD

The present disclosure relates generally to presenting defocused content based on eye-tracking information.

DESCRIPTION OF RELATED ART

Content may be viewed by users on a variety of devices such as televisions, computers, mobile devices, and tablet computers. Transmitting content to devices often requires significant amounts of bandwidth. Mobile devices in particular often suffer from a lack of available bandwidth for receiving content. Many mobile devices receive data services that are subject to caps or costs on bandwidth rates or an amount of data transmitted. Video compression techniques allow a reduction in the amount of data transmitted but result in a lower quality video image and a diminished viewing experience.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
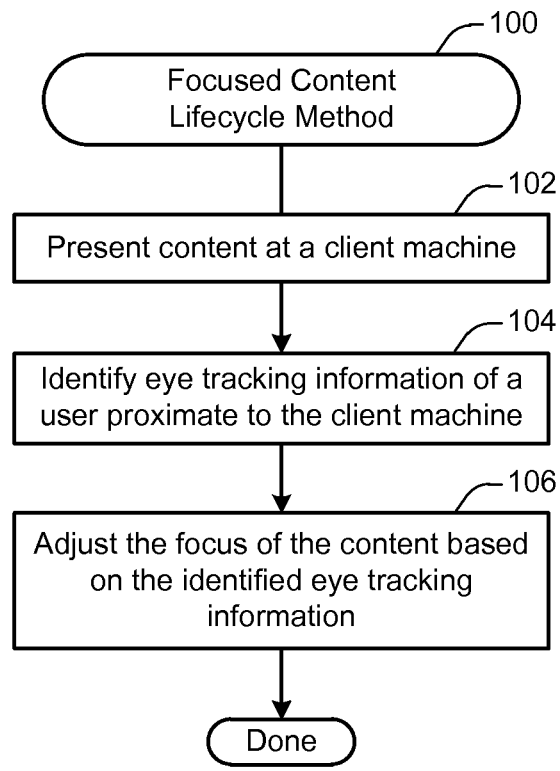
FIG. 1 illustrates one example of a method for conducting a focused content lifecycle.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

In most applications, video content is encoded such that different portions of any given video image exhibit similar video properties. That is, each portion of the screen is similar in terms of resolution, contrast ratio, sharpness, light intensity, and other properties. However, users often do not focus on all portions of video content equally. Instead, users often focus on a portion of the display screen that contains important, attractive, or attention-getting elements. For instance, users may focus more on the hero in an action movie and less on background elements that are positioned far from the hero on a display screen.

User eye tracking information may be monitored and tracked in the context of the presentation of video content. For instance, users' eyes may be observed to focus on a particular portion of a display screen during a particular period of time when particular video content is presented. Based on this observation, the video content may be encoded to provide for differential treatment of different portions of the content. For example, a portion of the video content on which users' eyes are focus less may be defocused relative to other portions of the video content.

Example Embodiments

According to various embodiments, eye tracking based defocusing may in some cases allow for the transmission of video content from servers to client machines with lower bandwidth usage than conventional techniques. For instance, video content may be encoded such that portions of the video content that are not typically focused on by users are encoded to fit a smaller data size. Although such an encoding may result in some reduction in quality, the effect may be kept small by defocusing the less important video content portions. When the video content is encoded at a smaller data size, less data needs to be transmitted from the server to the client device, thus lowering the bandwidth required to communicate the video content.

According to various embodiments, eye tracking based defocusing may in some cases allow for the transmission of video content of a perceptibly higher quality than conventional techniques. For instance, video content may be encoded such that portions of the video content that are typically focused on by users are encoded at a higher quality level. Then, even if other portions of the video content are encoded at the same or lower quality level, the user may experience the content at a heightened quality level since the user is likely to focus on the higher quality portion of the video content. In some instances, by increasing the quality of the video content portions the user is likely to focus on while decreasing the quality of other video content portions, the user can experience the video content at a perceptibly higher quality while the total bandwidth required to transmit the video content stays constant or is reduced.

According to various embodiments, eye tracking based defocusing may in some cases allow for lower processing resource usage and/or lower power consumption during the encoding process. Encoding video content for transmission to a client machine may require significant computing resources, particularly when a service provider is encoding thousands of video streams for transmission to tens of thousands of client machines. By reducing the required encoding quality for portions of video streams that users are less likely to focus on, the usage of these computing resources may be reduced.

According to various embodiments, eye tracking based defocusing may in some cases allow for lower processing resource usage, lower power consumption, or otherwise lower computing resource usage during presentation of video content. For example, when a computing device determines that the user is focused on a particular portion of a display screen, the computing device may reduce the brightness or contrast ratio on another portion of the display screen. As another example, when a portion of a video content stream received from a remote server is encoded at a lower quality level, processing the video stream to prepare the video content stream for presentation may require comparatively lower computing resources.

FIG. 1 illustrates one example of a method 100 for conducting a focused content lifecycle. According to various embodiments, the method 100 may be conducted at a server in communication with a client machine. When video content is presented at the client machine, the user's eyes may be tracked to identify the portions of the video content on which the user focuses. Then, the encoding of the video content may be updated so that the portions of the video content on which the user focuses less are defocused relative to the portions of the video content on which the user focuses more.

At 102, content is presented at a client machine. According to various embodiments, the client machine may be any computing device capable of presenting video content and communicating with a remote server. For instance, the client machine may be a desktop computer, laptop computer, tablet computer, mobile phone or other mobile device, or television.

According to various embodiments, the content presented at the client machine may be received from any of various sources. For example, the content may be stored locally on the client machine. As another example, the content may be streamed or downloaded via a network such as the Internet from a content service provider such as Netflix, iTunes, or Amazon. As yet another example, the content may be retrieved from a network storage location.

At 104, eye tracking information of a user proximate to the client machine is identified. According to various embodiments, the eye tracking information may be identified by use of an optical sensor. The optical sensor may be used to determine location, orientation, and movement information for the user's eyes or other facial features. Techniques for identifying eye tracking information are discussed in further detail with respect to FIG. 3.

According to various embodiments, various types of eye tracking information may be monitored. The eye-tracking information that may be monitored and processed may include, but is not limited to: user eye movement velocity and acceleration, the location at which a user is gazing, the duration or "dwell" of a user's gaze at a particular location or locations, a blink frequency, the dilation of a user's pupils, the eyelid aperture size, and/or other eye-related information. Also, the eye-tracking information may include data used to identify a user's facial expressions or other indications of a user's mood, opinion, or impressions when viewing content presented on a portion of the display screen. Accordingly, although the information may be referred to herein as "eye-tracking information", in some instances this information may include data regarding the user's facial movements, head location, head orientation, or other such related information.

At 106, the focus of the content is adjusted based on the identified eye tracking information. According to various embodiments, adjusting the focus of the content may involve any operation for focusing, emphasizing, or improving the quality of at least one portion of the video content relative to another portion of the video content. Adjusting the focus of the content may also involve any operation for defocusing, deemphasizing, or reducing the quality of at least one portion of the video content relative to another portion of the video content. Techniques for adjusting the focus of video content are discussed in further detail with respect to FIG. 4.

Figure 2:
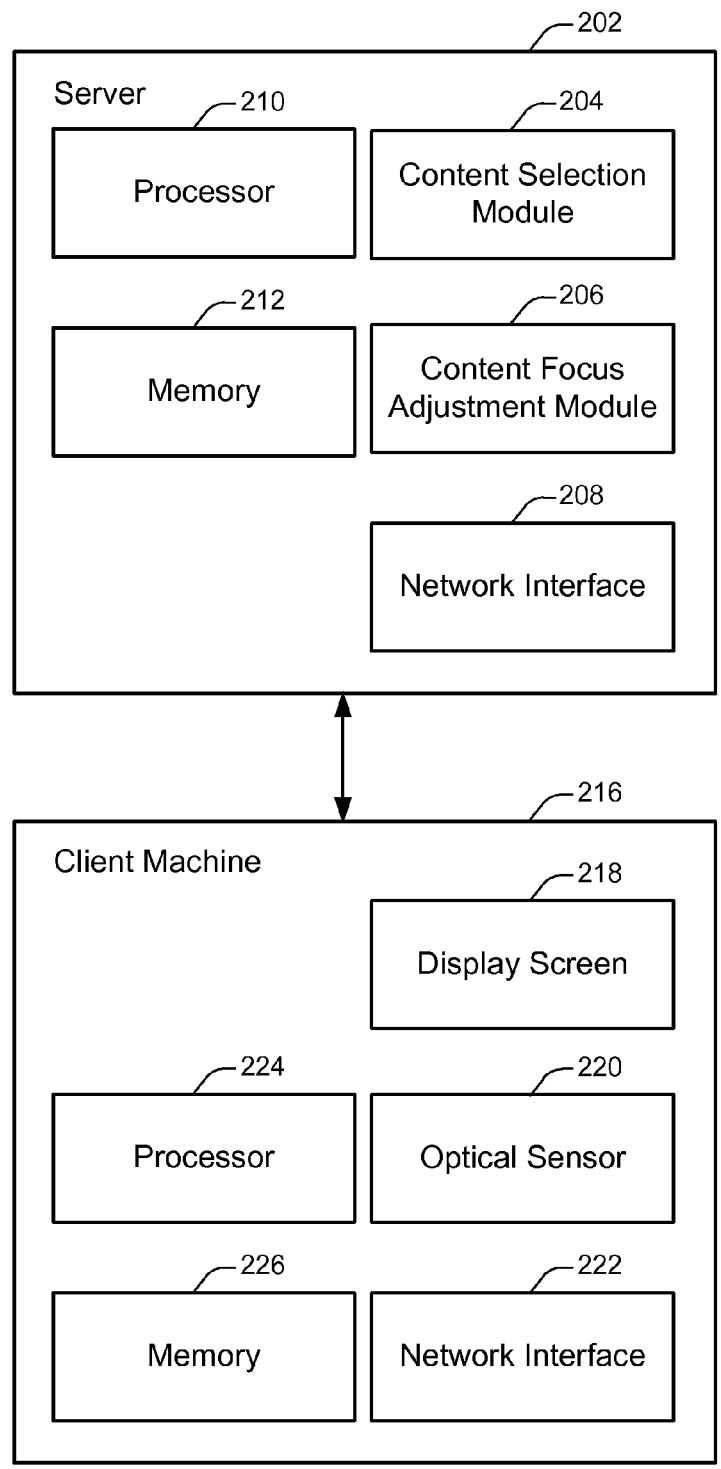
FIG. 2 illustrates an example of a system that can be used with various techniques and mechanisms of the present invention.

FIG. 2 illustrates an example of a system 200. According to various embodiments, the system 200 may be used in conjunction with techniques described herein to collect eye tracking information and defocus video content for presentation at a client machine. The system 200 includes a server 202 and a client machine 216. The server and the client machine may communicate via a network interface 208 at the server and a network interface 222 at the client machine.

The client machine includes a processor 224 and memory 226. Additionally, the client machine includes a display screen 218 configured to display content. The client machine also includes an optical sensor 220 operable to collect eye tracking information from an individual in proximity to the client machine.

The server includes a content focus adjustment module 206 operable to adjust the focus of video content transmitted to the client machine. The server also includes a content selection module 204 operable to select content for presentation at the client machine. As well, the server includes a processor 210 and memory 212.

According to various embodiments, as described herein, a server may include components not shown in FIG. 2. For example, a server may include one or more processors, memory modules, storage devices, and/or communication interfaces. As another example, a server may include software and/or hardware operable to retrieve content and provide the content to client machines.

The content focus adjustment module 206 is operable to adjust the focus of video content for transmission to a client machine. For instance, the content focus adjustment module 206 may analyze eye tracking information to identify portions of video content that may be focused or defocused. Then, the content focus adjustment module 206 may conduct various types of operations for focusing or defocusing the identified portions of the video content. The adjustment of focus for video content is discussed in further detail with respect to FIG. 4.

The content selection module 204 in the server is operable to select content to present at the client device. According to various embodiments, the content selection module 204 may be operable to identify a data constraint or preference associated with a particular client device or user account. Based on the identified information, the content selection module 204 can select a particular encoding of video content. The encoding may have a larger or smaller data size, be subject to more or less focus adjustment, or have other properties based on the device to which the video content is sent and/or a user account associated with the device. Techniques for transmitting focus-adjusted content to a client device are discussed in further detail with respect to FIG. 5.

The network interface 208 is configured to receive and transmit communications via a network such as the Internet. According to various embodiments, the network may be a wired network or a wireless network. The network interface may communicate via HTTP, TCP/IP, UDP, or any other communication protocol. Content may be transmitted to the client machine via unicast, multicast, broadcast, or any other technique. Also, content need not be transmitted by the server 202. For example, in particular embodiments the server 202 may select content for presentation, while another server may transmit the content to the client machine.

The client machine 216 may be any device operable to receive content via a network and present the content on the display screen 218. For example, the client machine 218 may be a desktop or laptop computer configured to communicate via the Internet. As another example, the client machine may be a mobile device such as a cellular phone or tablet computer configured to communicate via a wireless network.

The display screen 218 may be any type of display screen operable to present content for display. For example, the display screen may be an LCD or LED display screen. As another example, the display screen may be a touch screen. The client machine 216 may include other components not shown in FIG. 2, such as one or more speakers, additional display screens, user input devices, processors, or memory modules.

The optical sensor 220 is operable to locate and track the state of one or both eyes of an individual in proximity to the client machine. The optical sensor is configured to receive and process light received at the sensor. According to various embodiments, the light received and processed by the optical sensor may be any light on the spectrum capable, including visible light, infrared light, ultraviolet light, or any other kind of light. The specific type of light sensor used may be strategically determined based on factors such as the type of device at which the sensor is located and the likely proximity of the user to the device. In particular embodiments, the light sensor may be a digital camera. Alternately, or additionally, an infrared sensor may be used.

According to various embodiments, more than one light sensor may be used. For example, information from two light sensors may be combined to triangulate a location of an eye. As another example, different types of light sensors may be used to provide better eye tracking information in various lighting conditions.

The network interface 222 is configured to receive and transmit communications via a network such as the Internet. According to various embodiments, the network may be a wired network or a wireless network. The network interface may communicate via HTTP, TCP/IP, UDP, or any other communication protocol. Content may be received at the client machine via unicast, multicast, broadcast, or any other transmission technique.

According to various embodiments, the components shown in the client or server in FIG. 2 need not be physically located within the same machine. For example, the optical sensor 220 shown in FIG. 2 may be a web camera in communication with the client machine via an interface such as USB. As another example, the user information storage module 206 may be located outside the server 202. For instance, the user information may be stored in a network storage location in communication with the server 202 via the network interface 208.

Figure 3:
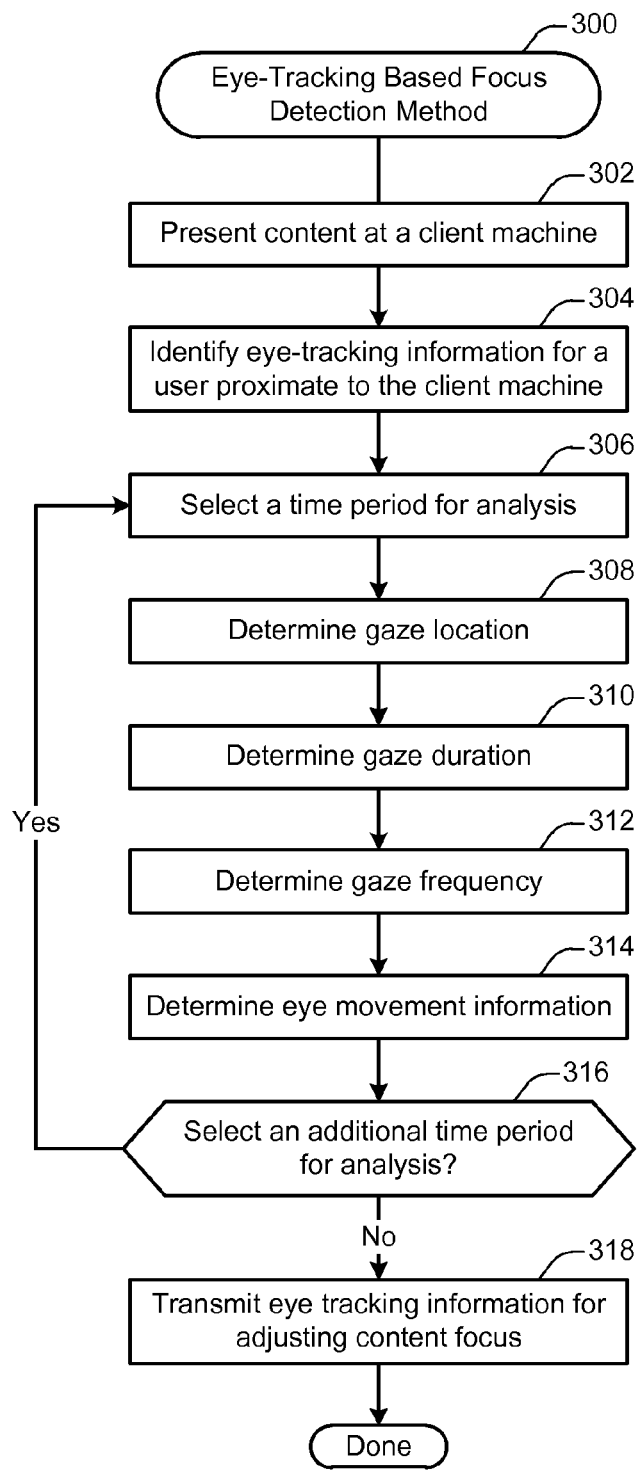
FIG. 3 illustrates an example of a method for detecting focus on portions of video content based on eye tracking information.

FIG. 3 illustrates an example of a method 300 for detecting focus on portions of video content based on eye tracking information. According to various embodiments, the method 300 may be used to present content on a client machine and identify eye-tracking information associated with a user or users viewing the content. Then, the eye-tracking information may be used to adjust a focus of the viewed content.

At 302, content is presented at a client machine. The content may be video content presented on a display screen. As discussed herein, content may be received from various sources. For instance, content may be streamed from a server in real time, downloaded from a server, retrieved from a local storage device, received from a network storage device, or retrieved in any other way.

According to various embodiments, the presentation of content may be associated with a user account. For example, a user may be logged in to a media content management system associated with a service provider. The service provider may provide services such as a content guide, content management, and content streaming. The user may receive such services via a user interface provided by the service provider. The user interface may interact with an optical device at the client machine to receive and/or analyze tracking information for the user's eyes.

At 304, eye-tracking information for a user is identified. According to various embodiments, the eye-tracking information may include any information used to acquire specific observations regarding the status or movement of the user's gaze, facial expressions, head movements or orientation, or other relevant information. For example, a location in space occupied by the user's eyes may be determined.

At 306, a time period is selected for analysis. According to various embodiments, eye tracking information may be analyzed in real time. For instance, a client machine may analyze data received via an optical sensor, identify areas of focus, and transmit an indication of the identified areas to a server. In this case, the selected time period may be the current time period.

According to various embodiments, eye tracking information may be analyzed by a client machine and/or server after a video has been presented. For instance, data received via an optical sensor may be stored for later analysis. Then in some cases, the data may be transmitted to the remote server. Either the client machine or server may then select time periods for analysis. The time periods may be selected sequentially or based on other criteria, such as based on which time periods are most likely to gain from focus adjustment. For example, during some periods, a user's eyes may quickly shift focus to many areas of the screen, which may suggest that focusing or defocusing some portions of the video content relative to other portions of the video content is unwise. As another example, during some periods, a user's eyes may focus primarily on a single area of the screen, which may suggest that the time periods are good candidates for focus adjustment.

At 308, gaze location is determined. According to various embodiments, the gaze location may correspond to an area of the display screen or video content on which the user's eyes are focused. The gaze location may be identified based on a central point, a set of points, or a screen portion on which the user's eyes are focused. The gaze location may correspond to a particular person or thing within the video content. For instance, in an action movie, the gaze location may correspond to the hero or another character, an explosion, a fuse, or anything else displayed in a particular portion of the display screen.

At 310, gaze duration is determined. According to various embodiments, the gaze duration may correspond to a time period during which the user's eyes were primarily focused on the location determined in operation 308.

At 312, gaze frequency is determined. According to various embodiments, the gaze frequency may correspond to a number of occurrences or a percentage of time that the user's eyes focus on an identified portion of the video content. For example, a user may focus primarily on an action hero in a movie but frequently glance at another area of interest, such as a villain sneaking up on the hero. By determining gaze frequency, the relative importance of various portions of the video content may be identified.

At 314, eye movement information is determined. As discussed herein, the eye movement information may include velocity, direction, and/or acceleration information. According to various embodiments, if a user quickly looks toward a particular area of the screen, then screen portion may be selected for having a higher focus. Similarly, if a user quickly looks away from a particular area of a display screen, then video content displayed on the screen portion may be selected for defocusing.

At 316, a determination is made as to whether to select an additional time period for analysis. As discussed with respect to operation 306, various criteria may be used for selecting time periods for analysis. Accordingly, an additional time period may be selected until all periods are analyzed, until a sufficient reduction in data size is achieved, until analyzing additional time periods is unlikely to yield profitable reductions in data size, or until any other criteria are met.

At 318, eye tracking information is transmitted for adjusting content focus. If the eye tracking based focus detection method is performed at least in part at a client machine, then the eye tracking information may be transmitted to a server. If the eye tracking based focused detection method is performed at least in part at the server, then the eye tracking information may be transmitted to a storage medium for storage.

Figure 4:
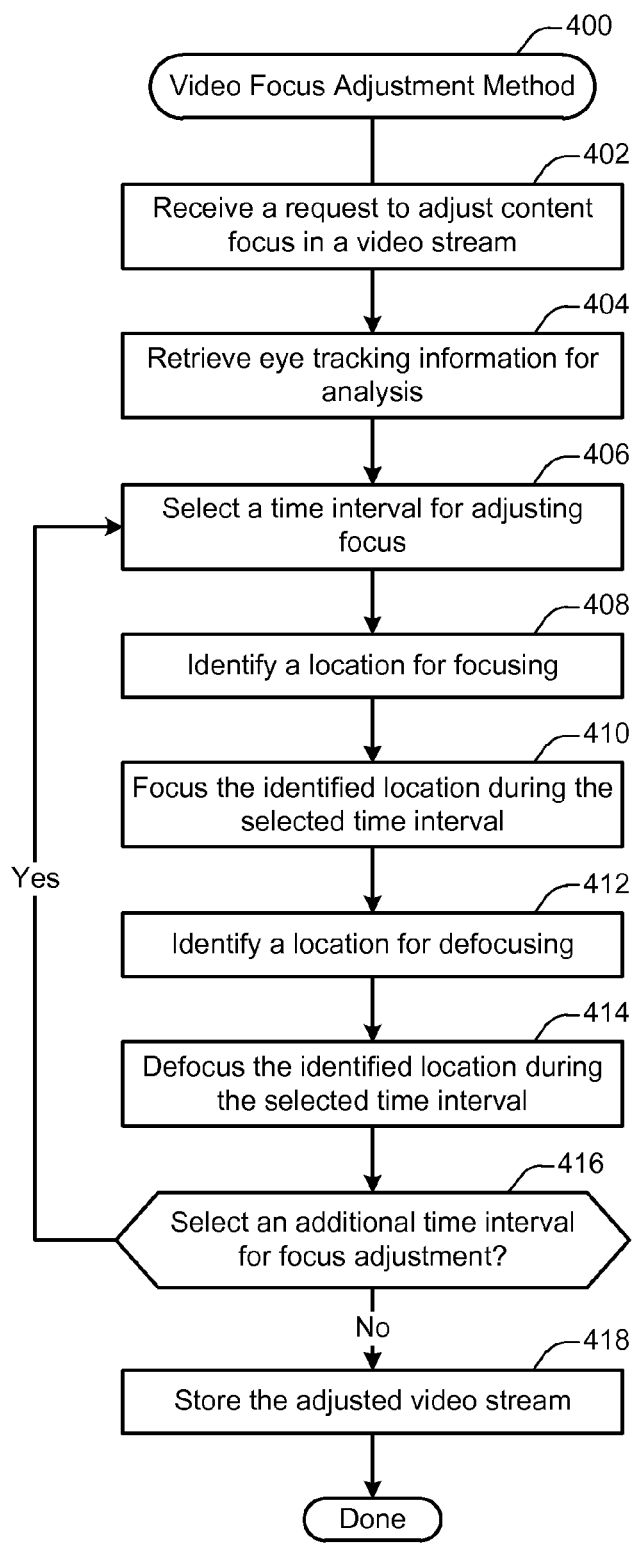
FIG. 4 illustrates an example of a method for adjusting video focus.

FIG. 4 illustrates an example of a method 400 for adjusting video focus. According to various embodiments, the method 400 may be used to process eye tracking information to identify portions of video content that may be focused or defocused. Eye tracking information may be collected from a number of users. Then, the information may be used to identify portions of the video content on which users tend to focus or to not focus.

According to various embodiments, the method 400 may be performed at a system configured to provide video streams encoded for presentation at client devices. For example, the method 400 may be performed at a device or system described with respect to FIGS. 6 and 7.

According to various embodiments, the method 400 may be performed at least in part at a client machine. For example, a client machine may present a video stream, analyze the video stream based on the eye tracking information, and transmit video stream focus information and/or eye tracking information to a server. For future portions of the video stream, a prediction may be made as to which portions of the video content to focus or defocus. Then, the video stream may be focused or defocused in real time.

At 402, request to adjust content focus in a video stream is received. In particular embodiments, content focus may be adjusted periodically or occasionally. For example, content focus for a video stream may be adjusted when the system has received a sufficient amount of eye tracking information for the video stream. As another example, content focus for a video stream may be adjusted whenever the video stream is processed for encoding. As yet another example, content focus for a video stream may be adjusted at regular time intervals, upon request, or upon detection of a triggering event or other criteria.

According to various embodiments, the video stream may be any video content capable of being transmitted from a server for presentation at a client machine. For example, the video stream may be transmitted via broadcast, unicast, or multicast transmission techniques. As another example, the video stream may be a live stream or a pre-recorded stream. In some cases, the video stream may include one or more files that a client machine may download and present later. Alternately, or additionally, the video stream may be configured for live streaming and presentation to client machines. The video stream may include information other than video, such as one or more audio tracks, images, metadata, or other such information.

At 404, eye tracking information is received for analysis. According to various embodiments, eye tracking information may be received for a single user or for any number of users. For example, eye tracking information may be received from a client machine in real time to update a stream being sent to the client machine. In this case, the eye tracking information may be used to predict areas of focus for subsequently transmitted portions of the video stream. As another example, eye tracking information collected from a large group of users for a video stream may be aggregated for the purpose of analyzing and re-encoding the video stream for future viewing by other users.

At 406, a time interval for adjusting focus is selected. According to various embodiments, various techniques may be applied for selecting a time interval. For example, each time interval in a video stream may be analyzed sequentially or in some other order. As another example, the selection of time intervals may be prioritized by identifying time intervals likely to benefit from focus adjustment. For instance, during some time intervals users may be observed to focus on a limited portion of the video content, which may make focus adjustment techniques more beneficial. During other time intervals, users may be observed to quickly shift focus to many areas of the video content or to not focus on any portion of the video content in particular, which may make focus adjustment techniques less beneficial. As yet another example, time intervals throughout a video stream may be sampled to identify patterns of eye movement that may be used to predict eye movement in unanalyzed time interval portions. In this case, only some time intervals may be analyzed, while even unanalyzed time intervals may be subjected to focus adjustment.

At 408, a location is identified for focusing. According to various embodiments, a location for focusing may be a location that users tend to focus on while viewing the video stream. For example, the location may correspond to an important object or character. As another example, the location may be positioned toward the center of the video content, which users may tend to focus on more. As yet another example, the location may correspond to changing or unexpected content that draws the user's attention.

According to various embodiments, the location for defocusing may be identified by various techniques. For example, the eye tracking information may be analyzed to select a location with a high frequency or time percentage of user eye focus. As another example, the eye tracking information may be analyzed to select a location with extended gaze duration. As yet another example, the eye tracking information may be analyzed to select a location that is the subject of eye movements having movement, high velocity movement, or high acceleration movement toward it.

At 410, the identified location is focused during the selected time interval. According to various embodiments, various techniques may be used to focus the identified location. For example, the video content associated with the identified location may be encoded at a higher resolution, contrast ratio, or light intensity for a given period of time. As another example, the video content associated with the identified location may be sharpened or subjected to a relatively high-pass filter to increase the amount of detail shown at the identified location relative to other locations. As yet another example, the video content associated with the identified location may be encoded at a relatively higher refresh rate.

At 412, a location for defocusing is identified. According to various embodiments, a location for defocusing may be a location that users do not tend to focus on while viewing the video content. For example, the location may correspond to background scenery or characters. As another example, the location may be close to the edge of the video content, and users may tend not to focus on the edge of a display screen. As yet another example, the video content may include elements that draw the user's attention away from the location to a different location.

According to various embodiments, the location for defocusing may be identified by various techniques. For example, the eye tracking information may be analyzed to select a location with a low frequency or time percentage of user eye focus. As another example, the eye tracking information may be analyzed to select a location with limited gaze duration. As yet another example, the eye tracking information may be analyzed to select a location that is not the subject of eye movements having movement, high velocity movement, or high acceleration movement toward it. As still another example, the eye tracking information may be analyzed to select a location that is the subject of eye movements having movement, high velocity movement, or high acceleration movement away from it.

According to various embodiments, the location for focusing or defocusing may be predicted based on eye tracking information for other time periods. For example, if users tend to focus on a particular character in a movie during one time period, then the system may predict that users will tend to focus on the character during other time periods that display similar video content. As another example, as discussed with respect to operation 406, eye tracking information for video content may be sampled at various time periods during the presentation of the video content to determine broad focus trends without analyzing eye tracking information during the entire presentation of the video content.

At 414, the identified location is defocused during the selected time interval. According to various embodiments, various techniques may be used to defocus the identified location. For example, the video content associated with the identified location may be encoded at a lower resolution, contrast ratio, or light intensity for a given period of time. As another example, the video content associated with the identified location may be blurred or subjected to a filter such as a low-pass filter to reduce the amount of detail shown at the identified location. As yet another example, the video content associated with the identified location may be encoded at a relatively lower refresh rate.

According to various embodiments, any available video processing technique may be used to focus or defocus portions of the image. These techniques may include, but are not limited to: deblocking, resizing, deinterlacing, denoising, deflicking, tinting, color grading, superresolution techniques, interpolation, deringing, requantizing, and luminance altering. In particular embodiments, techniques may be applied in two dimensional or three dimensional video. Other techniques may include, but are not limited to: high dynamic range rendering, blooming, motion blur, screen space ambient occlusion, cel shading, crepuscular ray alteration, film grain simulation, depth of field alteration, and shadow mapping.

According to various embodiments, an identified location may be focused or defocused during only a portion of the time interval. For example, the eye tracking analysis may reveal that users tend to look away from a particular location at a designated time and then return to gazing at the identified location at another time. For the time period between these two times, the identified location may be defocused. Similarly, the eye tracking analysis may reveal that users tend to look toward a particular location during a designated time period and then look away from the location. In this case, the location may be focused during the designated time period.

According to various embodiments, more than one location may be selected for focusing and/or defocusing. For example, users may tend to glance back and forth between two portions of video content while tending to ignore other portions. As another example, users may tend to focus on the center portion of video content while ignoring the left and right sides of the screen.

At 416, a determination is made as to whether to select an additional time interval for focus adjustment. As discussed with respect to operation 404, either all or selected time intervals may be analyzed for focus adjustment purposes. In some cases, only time intervals that are likely to offer significant gains from focus adjustment are analyzed. For example, in some time intervals users' eyes may tend to focus primarily on a limited portion of the video stream, while in other time intervals users' eyes may tend to quickly move over all areas of the video stream.

At 418, the adjusted video stream is stored. According to various embodiments, video streams may be stored with different encodings so that the video streams may be transmitted to different types of client machines operating under various types of data constraints and in accordance with various types of user preferences, as discussed with respect to FIG. 5. In some instances, the adjusted video stream may be stored to a storage medium for subsequent transmission to a client machine. In other cases, the adjusted video stream may be stored to a buffer for immediate transmission to a client machine.

According to various embodiments, not all of the operations shown in FIG. 4 need be performed. For example, in some instances only focusing may be performed, while in other cases only defocusing may be performed.

Figure 5:
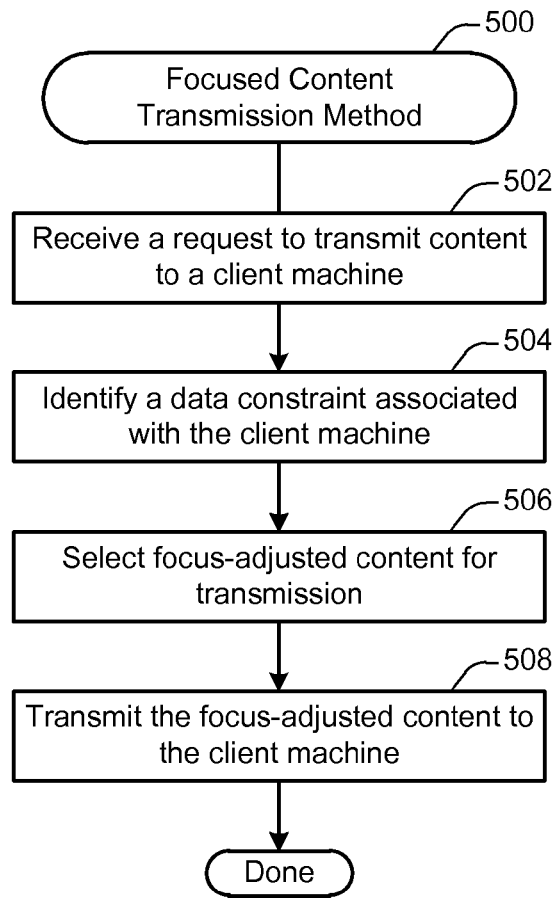
FIG. 5 illustrates one example of a method for transmitting focus-adjusted content.

FIG. 5 illustrates an example of a method 500 for transmitting focus-adjusted content to a client machine. According to various embodiments, the method 500 may be performed on a server operable to provide video content services to client machines. The method 500 may be used to select particular focus-adjusted content for transmission to the client machine based on preferences or constraints associated with the client machine.

At 502, a request to transmit content to a client machine is received. According to various embodiments, the request may be associated with a particular user account or identifier. Based on the request or the user account, the server may identify the device for which the content is requested. For instance, the device may be a television, mobile phone, or computer.

At 504, a data constraint associated with the client machine is identified. According to various embodiments, the data constraint may be any consideration or limitation associated with transmitting data to the client machine or presenting video content at the client machine. For example, the data constraint may be a resolution or contrast ratio limit of the display screen at the client device. As another example, the data constraint may be a bandwidth limit for transmitting data to the client device. As yet another example, the data constraint may be a video content preference associated with a user account linked to the client machine. In some instances, more than one constraint or preference may be identified.

At 506, focus-adjusted content is selected for transmission. According to various embodiments, video content may be encoded in various ways. For example, video content may be encoded with various resolutions, data rates, data sizes, and other properties. As another example, video content may be encoded with more or less defocusing on key screen portions. Thus, focus-adjusted content may be selected based on the constraints and/or preferences identified at operation 504.

Figure 6:
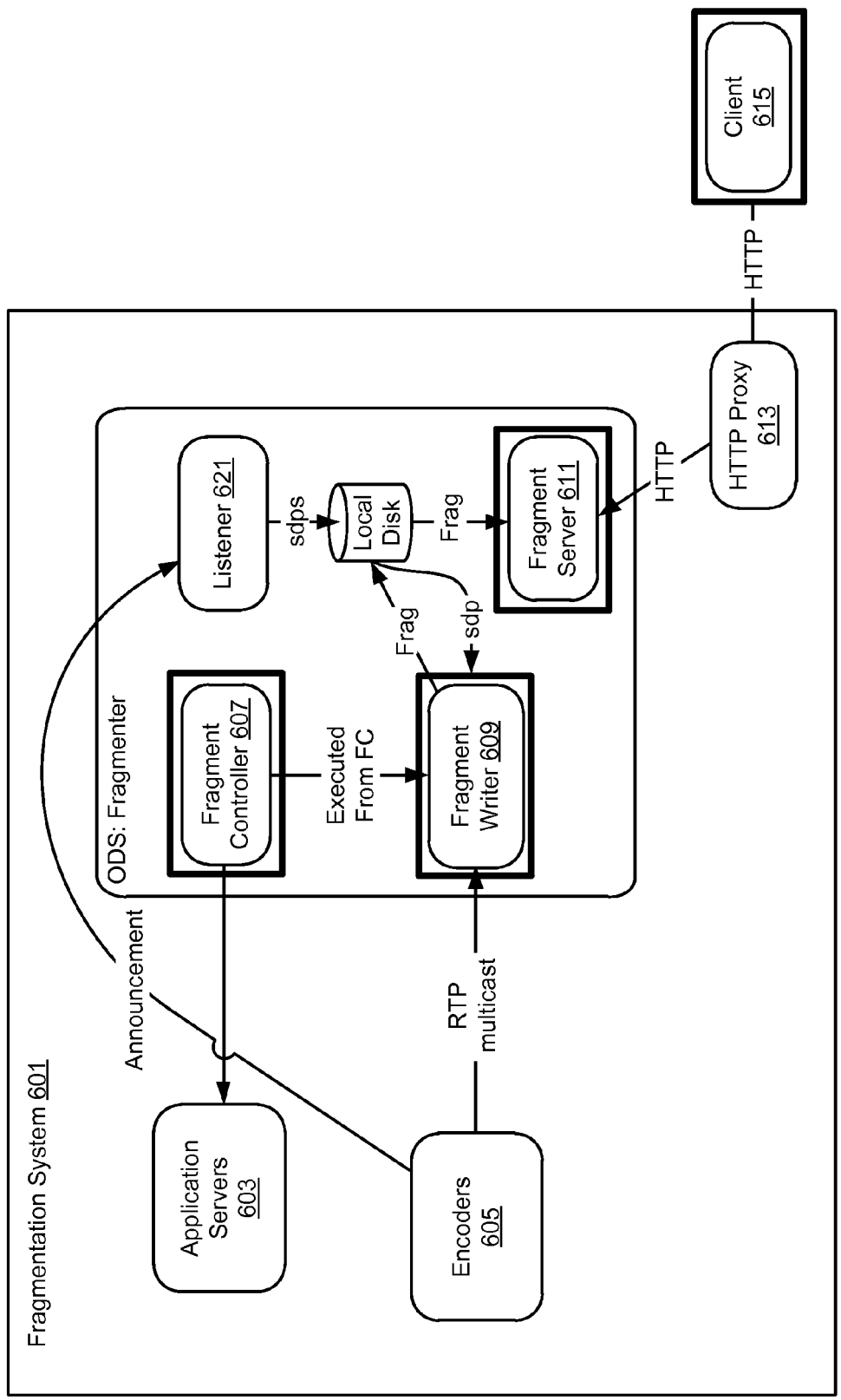
FIG. 6 illustrates another example of a media delivery system.

FIG. 6 is a diagrammatic representation illustrating one example of a fragment or segment system 601 associated with a content server that may be used in a broadcast and unicast distribution network. Encoders 605 receive media data from satellite, content libraries, and other content sources and sends RTP multicast data to fragment writer 609. The encoders 605 also send session announcement protocol (SAP) announcements to SAP listener 621. According to various embodiments, the fragment writer 609 creates fragments for live streaming, and writes files to disk for recording. The fragment writer 609 receives RTP multicast streams from the encoders 605 and parses the streams to repackage the audio/video data as part of fragmented MPEG-4 files. When a new program starts, the fragment writer 609 creates a new MPEG-4 file on fragment storage and appends fragments. In particular embodiments, the fragment writer 609 supports live and/or DVR configurations.

The fragment server 611 provides the caching layer with fragments for clients. The design philosophy behind the client/server application programming interface (API) minimizes round trips and reduces complexity as much as possible when it comes to delivery of the media data to the client 615. The fragment server 611 provides live streams and/or DVR configurations.

The fragment controller 607 is connected to application servers 603 and controls the fragmentation of live channel streams. The fragmentation controller 607 optionally integrates guide data to drive the recordings for a global/network DVR. In particular embodiments, the fragment controller 607 embeds logic around the recording to simplify the fragment writer 609 component. According to various embodiments, the fragment controller 607 will run on the same host as the fragment writer 609. In particular embodiments, the fragment controller 607 instantiates instances of the fragment writer 609 and manages high availability.

According to various embodiments, the client 615 uses a media component that requests fragmented MPEG-4 files, allows trick-play, and manages bandwidth adaptation. The client communicates with the application services associated with HTTP proxy 613 to get guides and present the user with the recorded content available.

Figure 7:
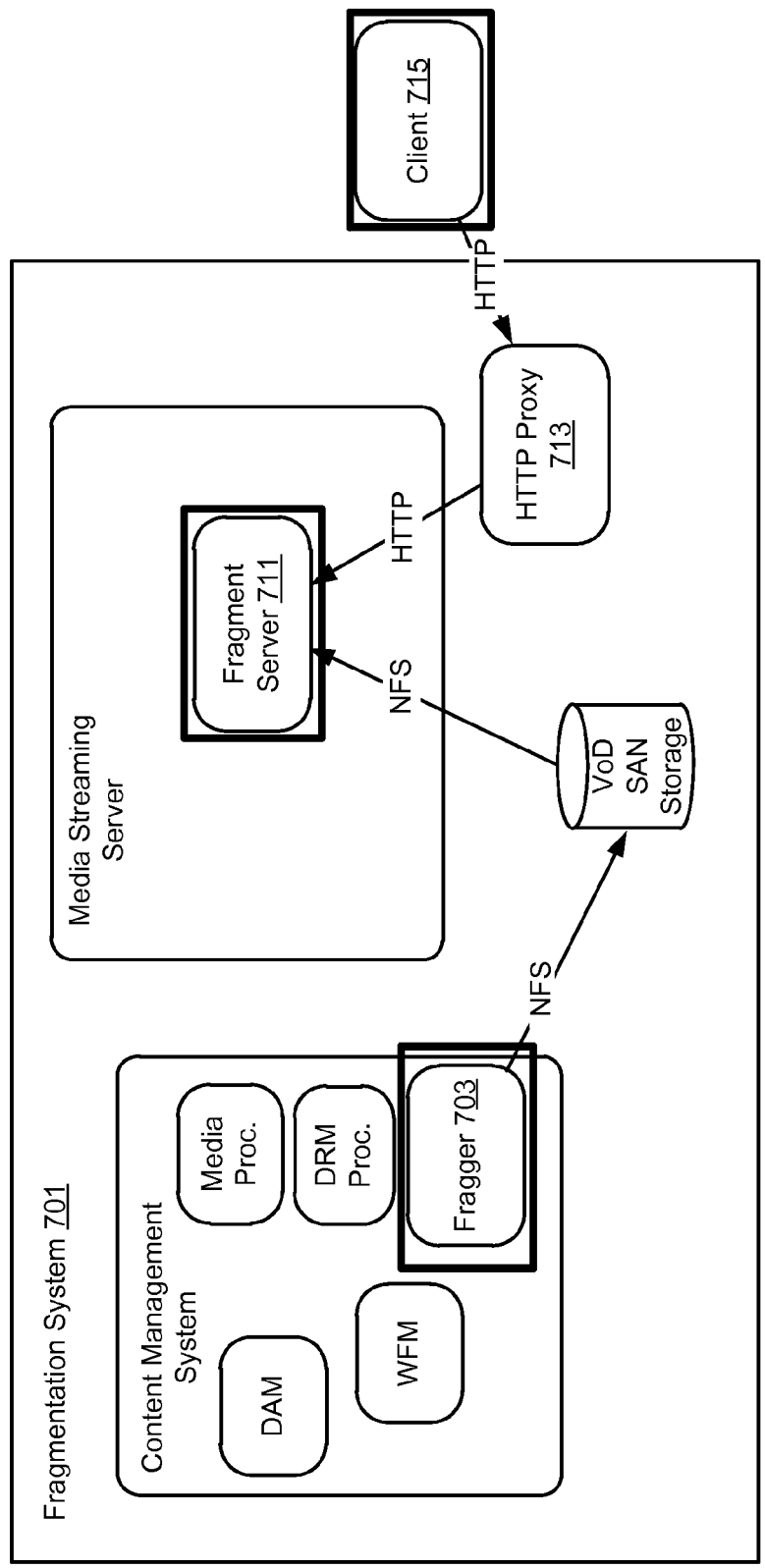
FIG. 7 illustrates examples of encoding streams.

FIG. 7 illustrates one example of a fragmentation system 701 that can be used for video-on-demand (VoD) content. Fragger 703 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 711 provides the caching layer with fragments for clients. The design philosophy behind the client/server API minimizes round trips and reduces complexity as much as possible when it comes to delivery of the media data to the client 715. The fragment server 711 provides VoD content.

According to various embodiments, the client 715 uses a media component that requests fragmented MPEG-4 files, allows trick-play, and manages bandwidth adaptation. The client communicates with the application services associated with HTTP proxy 713 to get guides and present the user with the recorded content available.

Figure 8:
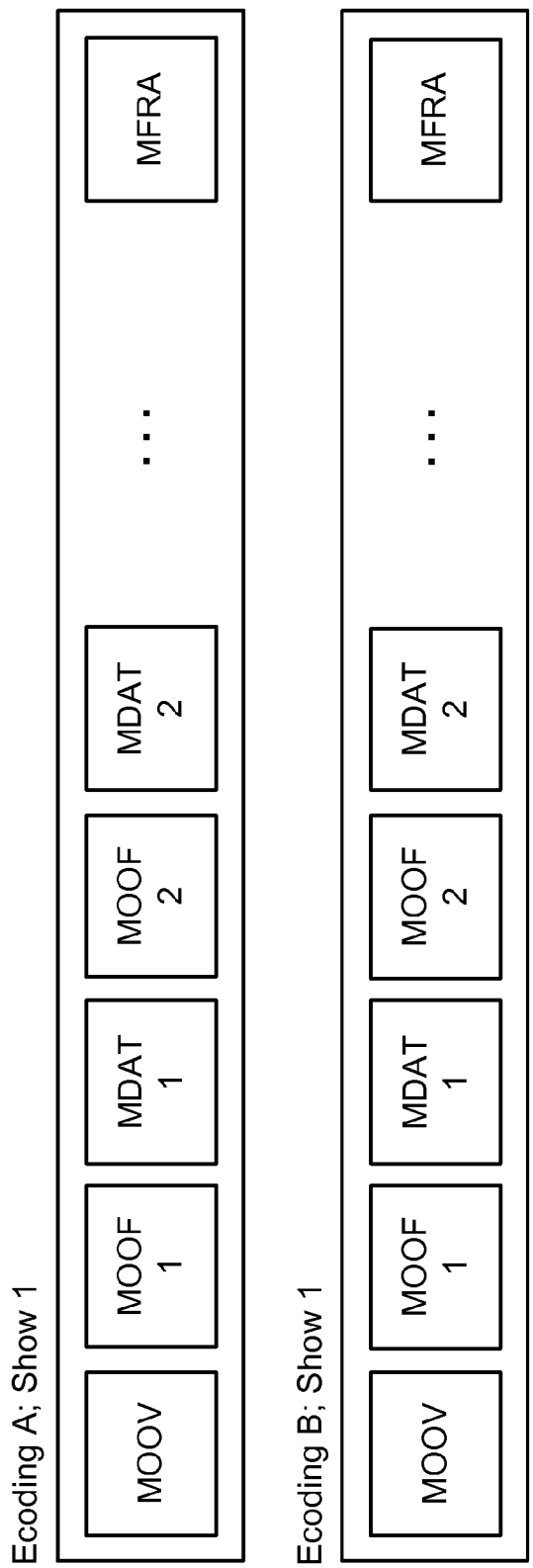
FIG. 8 illustrates one example of an exchange used with a media delivery system.

FIG. 8 illustrates examples of files stored by the fragment writer. According to various embodiments, the fragment writer is a component in the overall fragmenter. It is a binary that uses command line arguments to record a particular program based on either NTP time from the encoded stream or wallclock time. In particular embodiments, this is configurable as part of the arguments and depends on the input stream. When the fragment writer completes recording a program, it exits. For live streams, programs are artificially created to be short time intervals e.g. 5-15 minutes in length.

According to various embodiments, the fragment writer command line arguments are the SDP file of the channel to record, the start time, end time, name of the current and next output files. The fragment writer listens to RTP traffic from the live video encoders and rewrites the media data to disk as fragmented MPEG-4. According to various embodiments, media data is written as fragmented MPEG-4 as defined in MPEG-4 part 12 (ISO/IEC 14496-12). Each broadcast show is written to disk as a separate file indicated by the show ID (derived from EPG). Clients include the show ID as part of the channel name when requesting to view a prerecorded show. The fragment writer consumes each of the different encodings and stores them as a different MPEG-4 fragment.

In particular embodiments, the fragment writer writes the RTP data for a particular encoding and the show ID field to a single file. Inside that file, there is metadata information that describes the entire file (MOOV blocks). Atoms are stored as groups of MOOF/MDAT pairs to allow a show to be saved as a single file. At the end of the file there is random access information that can be used to enable a client to perform bandwidth adaptation and trick play functionality.

According to various embodiments, the fragment writer includes an option which encrypts fragments to ensure stream security during the recording process. The fragment writer will request an encoding key from the license manager. The keys used are similar to that done for DRM. The encoding format is slightly different where MOOF is encoded. The encryption occurs once so that it does not create prohibitive costs during delivery to clients.

The fragment server responds to HTTP requests for content. According to various embodiments, it provides APIs that can be used by clients to get necessary headers required to decode the video and seek any desired time frame within the fragment and APIs to watch channels live. Effectively, live channels are served from the most recently written fragments for the show on that channel. The fragment server returns the media header (necessary for initializing decoders), particular fragments, and the random access block to clients. According to various embodiments, the APIs supported allow for optimization where the metadata header information is returned to the client along with the first fragment. The fragment writer creates a series of fragments within the file. When a client requests a stream, it makes requests for each of these fragments and the fragment server reads the portion of the file pertaining to that fragment and returns it to the client.

According to various embodiments, the fragment server uses a REST API that is cache-friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

In particular embodiments, client requests for fragments follow the following format: http://{HOSTNAME}/frag/{CHANNEL}/{BITRATE}/[{ID}/]{COMMAND}[/{ARG}] e.g. http://frag.hosttv.com/frag/1/H8QVGAH264/1270059632.mp4/fragment/42. According to various embodiments, the channel name will be the same as the backend-channel name that is used as the channel portion of the SDP file. VoD uses a channel name of "vod". The BITRATE should follow the BITRATE/RESOLUTION identifier scheme used for RTP streams. The ID is dynamically assigned. For live streams, this may be the UNIX timestamp; for DVR this will be a unique ID for the show; for VoD this will be the asset ID. The ID is optional and not included in LIVE command requests. The command and argument are used to indicate the exact command desired and any arguments. For example, to request chunk 42, this portion would be "fragment/42".

The URL format makes the requests content delivery network (CDN) friendly because the fragments will never change after this point so two separate clients watching the same stream can be serviced using a cache. In particular, the head end architecture leverages this to avoid too many dynamic requests arriving at the Fragment Server by using an HTTP proxy at the head end to cache requests.

According to various embodiments, the fragment controller is a daemon that runs on the fragmenter and manages the fragment writer processes. A configured filter that is executed by the fragment controller can be used to generate the list of broadcasts to be recorded. This filter integrates with external components such as a guide server to determine which shows to record and which broadcast ID to use.

According to various embodiments, the client includes an application logic component and a media rendering component. The application logic component presents the user interface (UI) for the user, communicates to the front-end server to get shows that are available for the user, and authenticates the content. As part of this process, the server returns URLs to media assets that are passed to the media rendering component.

In particular embodiments, the client relies on the fact that each fragment in a fragmented MP4 file has a sequence number. Using this knowledge and a well-defined URL structure for communicating with the server, the client requests fragments individually as if it was reading separate files from the server simply by requesting URLs for files associated with increasing sequence numbers. In some embodiments, the client can request files corresponding to higher or lower bit rate streams depending on device and network resources.

Since each file contains the information needed to create the URL for the next file, no special playlist files are needed, and all actions (startup, channel change, seeking) can be performed with a single HTTP request. After each fragment is downloaded, the client assesses, among other things, the size of the fragment and the time needed to download it in order to determine if downshifting is needed or if there is enough bandwidth available to request a higher bit rate.

Because each request to the server looks like a request to a separate file, the response to requests can be cached in any HTTP Proxy, or be distributed over any HTTP based content delivery network CDN.

Figure 9:
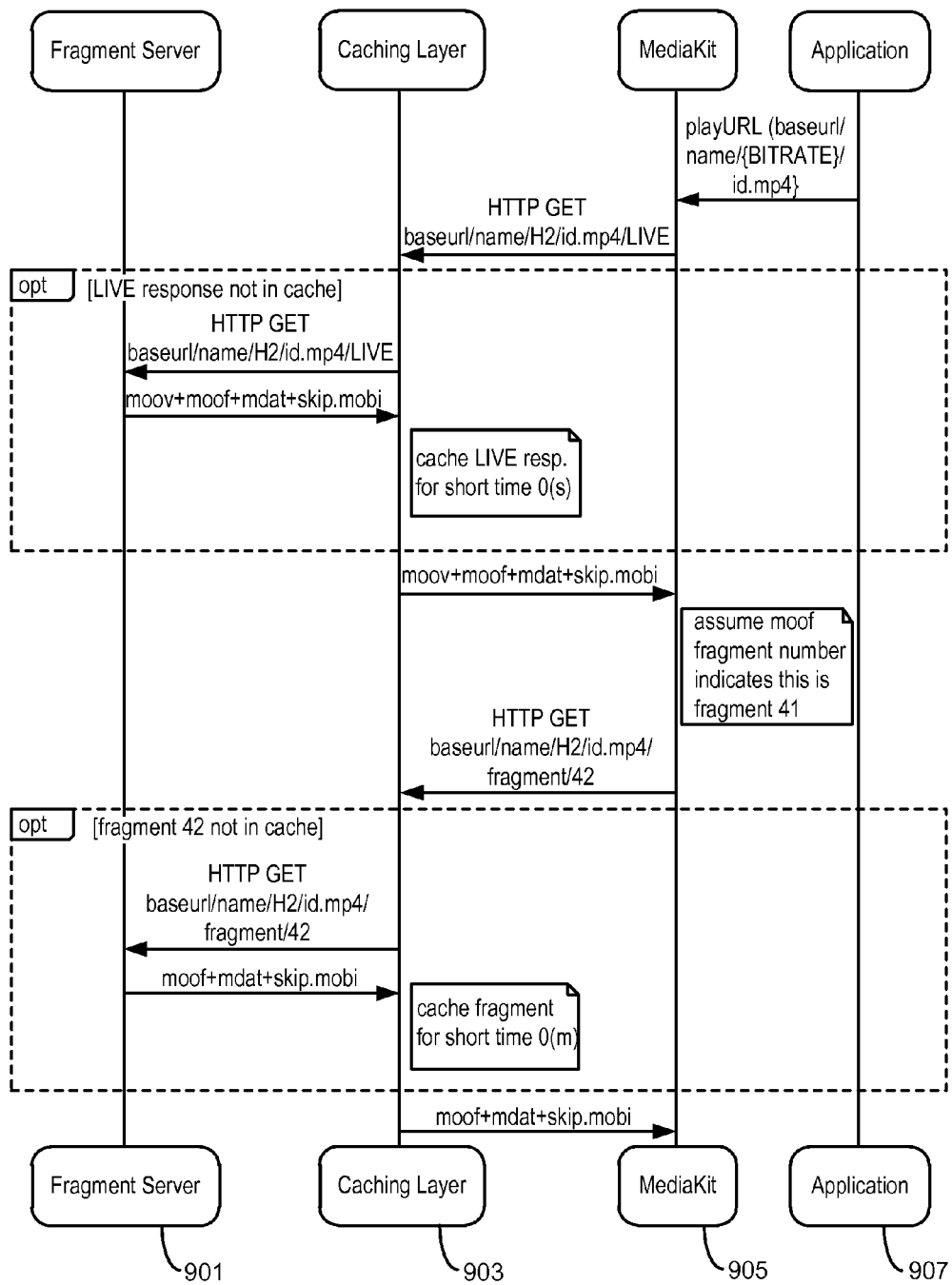
FIG. 9 illustrates one technique for generating a media segment.

FIG. 9 illustrates an interaction for a client receiving a media stream such as a live stream. The client starts playback when fragment 91 plays out from the server. The client uses the fragment number so that it can request the appropriate subsequent file fragment. An application such as a player application 907 sends a request to mediakit 905. The request may include a base address and bit rate. The mediakit 905 sends an HTTP get request to caching layer 903. According to various embodiments, the live response is not in cache, and the caching layer 903 forwards the HTTP get request to a fragment server 901. The fragment server 901 performs processing and sends the appropriate fragment to the caching layer 903 which forwards to the data to mediakit 905.

The fragment may be cached for a short period of time at caching layer 903. The mediakit 905 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 905 may request a next fragment having a different data rate. In some instances, the mediakit 905 may request a next fragment having a higher data rate. According to various embodiments, the fragment server 901 maintains fragments for different quality of service streams with timing synchronization information to allow for timing accurate playback.

The mediakit 905 requests a next fragment using information from the received fragment. According to various embodiments, the next fragment for the media stream may be maintained on a different server, may have a different bit rate, or may require different authorization. Caching layer 903 determines that the next fragment is not in cache and forwards the request to fragment server 901. The fragment server 901 sends the fragment to caching layer 903 and the fragment is cached for a short period of time. The fragment is then sent to mediakit 905.

Figure 10:
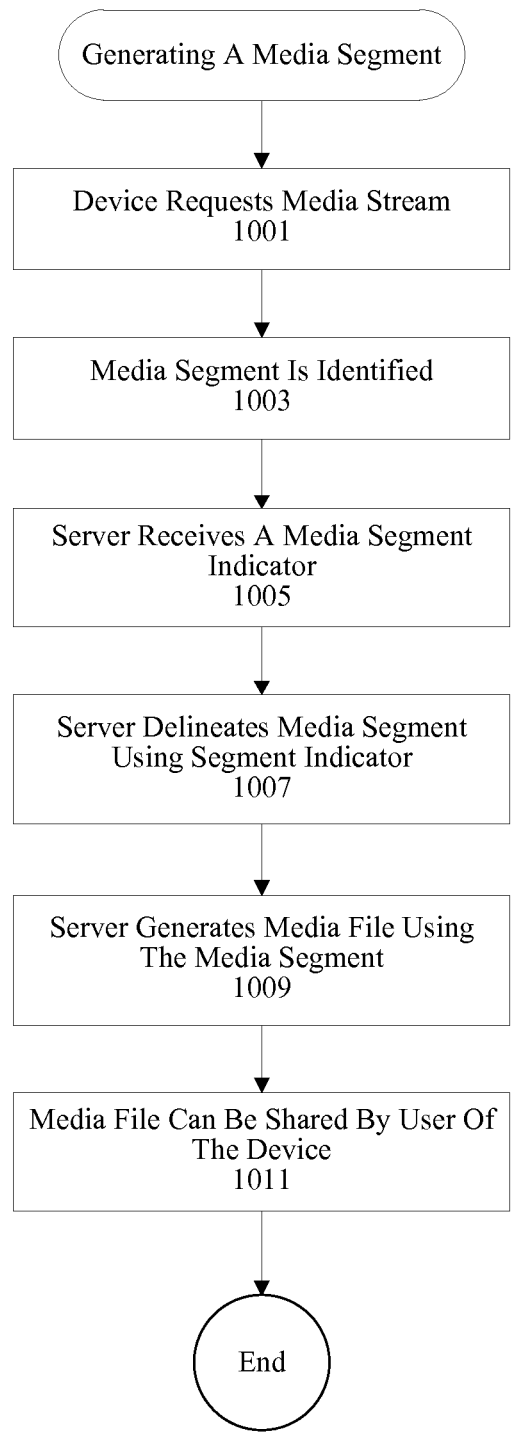
FIG. 10 illustrates one example of a system.

FIG. 10 illustrates a particular example of a technique for generating a media segment. According to various embodiments, a media stream is requested by a device at 1001. The media stream may be a live stream, media clip, media file, etc. The request for the media stream may be an HTTP GET request with a baseurl, bit rate, and file name. At 1003, the media segment is identified. According to various embodiments, the media segment may be a 35 second sequence from an hour long live media stream. The media segment may be identified using time indicators such as a start time and end time indicator. Alternatively, certain sequences may include tags such as fight scene, car chase, love scene, monologue, etc., that the user may select in order to identify a media segment. In still other examples, the media stream may include markers that the user can select. At 1005, a server receives a media segment indicator such as one or more time indicators, tags, or markers. In particular embodiments, the server is a snapshot server, content server, and/or fragment server. According to various embodiments, the server delineates the media segment maintained in cache using the segment indicator at 1007. The media stream may only be available in a channel buffer. At 1009, the server generates a media file using the media segment maintained in cache. The media file can then be shared by a user of the device at 1011. In some examples, the media file itself is shared while in other examples, a link to the media file is shared.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
   transmitting, from a server, video content for presentation at a remote computing device in communication with the server via a network;
   receiving, from the remote computing device, eye tracking information identified via an optical sensor at the remote computing device, the eye tracking information describing a state of one or both eyes of an individual located proximate to the remote computing device;
   identifying a first portion and a third party portion of the video content on which the eyes are more focused relative to a second portion of the video content;
   determining aggregated eye tracking information from a plurality of users, the aggregated eye tracking information including the received eye tracking information; and
   updating the video content based on the aggregated eye tracking information at selected time intervals, wherein the selection of time intervals are prioritized by identifying time intervals likely to benefit from focus adjustment, the second portion of the video content being defocused relative to the first portion and the third portion of the video content in the updated video content.

2. The method recited in claim 1, wherein the second portion of the video content is encoded at a lower resolution relative to the first portion of the video content.

3. The method recited in claim 1, wherein defocusing the second portion of the video content relative to the first portion of the video content comprises applying a technique selected from the group consisting of: dimming the second portion of the video content relative to the first portion of the video content, reducing the contrast of the second portion of the video content relative to the first portion of the video content, blurring the second portion of the video content relative to the first portion of the video content, and applying a coarser filter to the second portion of the video content relative to the first portion of the video content.

4. The method recited in claim 1, the method further comprising:
   transmitting the updated video content to a second remote computing device.

5. The method recited in claim 1, wherein the video content has a larger memory size in storage than the updated video content.

6. The method recited in claim 1, wherein the eye tracking information identifies a screen location on which the eyes are focused.

7. The method recited in claim 6, wherein the eye tracking information identifies a time duration during which the eyes are focused in the identified direction.

8. The method recited in claim 1, wherein the eye tracking information comprises movement information, the movement information identifying a direction and a velocity of eye movement.

9. The method recited in claim 8, wherein the eye movement information also identifies an acceleration of eye movement.

10. A system comprising:
    a remote computing device comprising:
       a network interface operable to receive video content for presentation at the remote computing device,
       a display screen operable to display the received video content,
       an optical sensor operable to identify eye tracking information describing a state of one or both eyes of an individual located proximate to the remote computing device,
       memory operable to store the received eye tracking information, and
       a processor operable to transmit the received eye tracking information via the network interface; and
    a server comprising:
       a network interface operable to communicate with the remote computing device via a network, and
       a processor operable to identify a first portion and a third portion of the video content on which the eyes are more focused relative to a second portion of the video content, determine aggregated eye tracking information for a plurality of users, and update the video content based on the aggregated eye tracking information at selected time intervals, wherein the selection of time intervals are prioritized by identifying time intervals likely to benefit from focus adjustment, the second portion of the video content being defocused relative to the first portion and the third portion of the video content in the updated video content, the aggregated eye tracking information including the received eye tracking information.

11. The system recited in claim 10, wherein the second portion of the video content is encoded at a lower resolution relative to the first portion of the video content.

12. The system recited in claim 10, wherein defocusing the second portion of the video content relative to the first portion of the video content comprises applying a technique selected from the group consisting of: dimming the second portion of the video content relative to the first portion of the video content, reducing the contrast of the second portion of the video content relative to the first portion of the video content, blurring the second portion of the video content relative to the first portion of the video content, and applying a coarser filter to the second portion of the video content relative to the first portion of the video content.

13. The system recited in claim 10, transmitting the updated video content to a second remote computing device.

14. The system recited in claim 10, wherein the video content has a larger memory size in storage than the updated video content.

15. The system recited in claim 10, wherein the eye tracking information identifies a screen location on which the eyes are focused.

16. The system recited in claim 15, wherein the eye tracking information identifies a time duration during which the eyes are focused in the identified direction.

17. One or more non-transitory computer readable media having instructions stored thereon for performing a method, the method comprising:
- transmitting, from a server, video content for presentation at a remote computing device in communication with the server via a network;
- receiving, from the remote computing device, eye tracking information identified via an optical sensor at the remote computing device, the eye tracking information describing a state of one or both eyes of an individual located proximate to the remote computing device;
- identifying a first portion and a third portion of the video content on which the eyes are more focused relative to a second portion of the video content;
- determining aggregated eye tracking information from a plurality of users, the aggregated eye tracking information including the received eye tracking information; and
- updating the video content based on the aggregated eye tracking information at selected time intervals, wherein the selection of time intervals are prioritized by identifying time intervals likely to benefit from focus adjustment, the second portion of the video content being defocused relative to the first portion and the third portion of the video content in the updated video content.

18. The one or more computer readable media recited in claim 17, wherein the second portion of the video content is encoded at a lower resolution relative to the first portion of the video content.

19. The one or more computer readable media recited in claim 17, wherein defocusing the second portion of the video content relative to the first portion of the video content comprises applying a technique selected from the group consisting of: dimming the second portion of the video content relative to the first portion of the video content, reducing the contrast of the second portion of the video content relative to the first portion of the video content, blurring the second portion of the video content relative to the first portion of the video content, and applying a coarser filter to the second portion of the video content relative to the first portion of the video content.

20. The one or more computer readable media recited in claim 17, transmitting the updated video content to a second remote computing device.

* * * * *